United States Patent
Khlat et al.

(10) Patent No.: US 8,509,718 B2
(45) Date of Patent: Aug. 13, 2013

(54) BROADBAND RECEIVE ONLY TUNER COMBINED WITH RECEIVE SWITCH

(75) Inventors: Nadim Khlat Khlat, Cugnaux (FR); Marcus Granger-Jones, Scotts Valley, CA (US)

(73) Assignee: RF Micro Devices, Inc., Greensboro, NC (US)

( * ) Notice: Subject to any disclaimer, the term of this patent is extended or adjusted under 35 U.S.C. 154(b) by 124 days.

(21) Appl. No.: 13/171,897

(22) Filed: Jun. 29, 2011

(65) Prior Publication Data
US 2012/0094623 A1   Apr. 19, 2012

Related U.S. Application Data

(60) Provisional application No. 61/392,571, filed on Oct. 13, 2010.

(51) Int. Cl.
*H04B 1/18* (2006.01)
(52) U.S. Cl.
USPC .................................. 455/193.1; 455/150.1

(58) Field of Classification Search
USPC ............. 455/330, 150.1, 193.1–193.2, 191.3, 455/269, 188.1, 191.1
See application file for complete search history.

(56) References Cited

U.S. PATENT DOCUMENTS
2004/0266378 A1* 12/2004 Fukamachi et al. ....... 455/188.1

* cited by examiner

*Primary Examiner* — Christian Hannon
(74) *Attorney, Agent, or Firm* — Withrow & Terranova, P.L.L.C.

(57) ABSTRACT

An antenna tuner unit (ATU) that provides broadband tuning is disclosed. The disclosed ATU includes a radio frequency (RF) switch circuit having an N number of switch inputs, wherein N is a natural number equal to 2 or greater. An N number of reactance elements are coupled in series between an RF input and one of the N number of switch inputs. Taps between adjacent pairs of the N number of reactance elements, wherein each of the taps is coupled to a corresponding one of the N number of switch inputs. The ATU further includes a capacitive element for each of the taps, wherein each capacitive element is coupled between a corresponding one of the taps and a voltage node. In at least one embodiment, each of the capacitive elements is made up of a programmable capacitor array.

22 Claims, 14 Drawing Sheets

| OPERATING BAND | UPLINK (UL) OPERATING BAND BS RECEIVE/UE TRANSMIT | | DOWNLINK (DL) OPERATING BAND BS TRANSMIT/UE RECEIVE | | DUPLEX MODE |
|---|---|---|---|---|---|
| | FUL LOW | FUL HIGH | FDL LOW | FDL HIGH | |
| 1 | 1920 MHz | 1980 MHz | 2110 MHz | 2170 MHz | FDD |
| 2 | 1850 MHz | 1910 MHz | 1930 MHz | 1990 MHz | FDD |
| 3 | 1710 MHz | 1785 MHz | 1805 MHz | 1880 MHz | FDD |
| 4 | 1710 MHz | 1755 MHz | 2110 MHz | 2155 MHz | FDD |
| 5 | 824 MHz | 849 MHz | 869 MHz | 894 MHz | FDD |
| 6 | 830 MHz | 840 MHz | 865 MHz | 875 MHz | FDD |
| 7 | 2500 MHz | 2570 MHz | 2620 MHz | 2690 MHz | FDD |
| 8 | 880 MHz | 915 MHz | 925 MHz | 960 MHz | FDD |
| 9 | 1749.9 MHz | 1784.9 MHz | 1844.9 MHz | 1879.9 MHz | FDD |
| 10 | 1710 MHz | 1770 MHz | 2110 MHz | 2170 MHz | FDD |
| 11 | 1427.9 MHz | 1447.9 MHz | 1475.9 MHz | 1495.9 MHz | FDD |
| 12 | 698 MHz | 716 MHz | 728 MHz | 746 MHz | FDD |
| 13 | 777 MHz | 787 MHz | 746 MHz | 756 MHz | FDD |
| 14 | 788 MHz | 798 MHz | 758 MHz | 768 MHz | FDD |
| 15 | RESERVED | | RESERVED | | - |
| 16 | RESERVED | | RESERVED | | - |
| 17 | 704 MHz | 716 MHz | 734 MHz | 746 MHz | FDD |
| 18 | 815 MHz | 830 MHz | 860 MHz | 875 MHz | FDD |
| 19 | 830 MHz | 845 MHz | 875 MHz | 890 MHz | FDD |
| 20 | 832 MHz | 862 MHz | 791 MHz | 821 MHz | FDD |

FIG. 3

BROADBAND RECEIVE ONLY TUNER COMBINED WITH RECEIVE SWITCH

RELATED APPLICATIONS

This application claims the benefit of provisional patent application Ser. No. 61/392,571, filed Oct. 13, 2010, the disclosure of which is hereby incorporated herein by reference in its entirety. This application is also related to utility application entitled COMBINED SWITCH AND RECEIVE TUNER FOR ENHANCED LTE-TDD SYSTEM having Ser. No. 12/900,056 and filed on Oct. 7, 2010 the disclosure of which is hereby incorporated herein by reference in its entirety.

FIELD OF THE DISCLOSURE

The present disclosure relates to an antenna tuner unit (ATU) having a receive only tuner circuit that is integrated with a receive switch. In particular, the present disclosure provides an ATU that has a relatively broad tuning range.

BACKGROUND

Antenna tuner units (ATU) are currently being considered for use in mobile terminals used for mobile radio communications. One purpose of an ATU is to match the impedance between a power amplifier (PA) and an antenna, thereby maximizing total radiated power (TRP). Another purpose of an ATU is to increase reception of radio signals by maximizing total isotropic sensitivity (TIS) for the antenna, especially since the antenna can experience large voltage standing wave ratio (VSWR) changes. For example, an antenna's input impedance is one parameter that can be affected by changes in a user's body placement versus the antenna. Certain body placements relative to the antenna will result in decreased radiated power due to a relatively large amount of power being reflected off the user's body, thus limiting the antenna's TRP. When the antenna is used for signal reception, other body placements relative to the antenna will reduce the TIS, resulting in poor receiver performance.

Presently, ATUs for cellular applications or mobile Internet devices (MIDs) that use third generation (3G) or fourth generation (4G) cellular systems are dual purpose ATUs. These ATUs are dual purpose in that they are used for impedance matching in both a transmit path and a receive path between a transceiver interface and a communicatively coupled antenna. These dual purpose ATUs require tuning elements that can handle large voltages due to the relatively large transmit powers involved. For example, dual purpose ATUs must be able to withstand a 6:1 VSWR. At a +33 dBm output power radiated from an antenna, a 6:1 VSWR requires a peak-to-peak voltage of 70 Vpk-pk. Micro-electromechanical systems (MEMS) switches having a large voltage drive have been developed to handle such large voltages. A disadvantage of MEMS switches is cost. Solid state switches using silicon-on-sapphire (SOS) or silicon-on-insulator (SOI) can also be used to handle large peak-to-peak voltages. However, at least fourteen cascode switches per switch branch must be used in order to handle 70 Vpk-pk. Thus, a die size for dual purpose ATUs must be relatively large, on the order of 3 mm$^2$. Due to such a relatively large die size, SOI technology may be required, which further increases cost. In a further complication, dual purpose ATUs in some cases requires coupling and detector circuitries to calculate optimum tuning settings.

Increasingly, there are wireless data applications for which a data rate is higher in a downlink direction than an uplink direction. As a result, there are asymmetrical data requirements between a receiver and a transmitter. These asymmetrical data requirements allows for a receive only ATU with an integrated switch that has significantly relaxed voltage handling requirements. As such, switch drivers, control circuitry, and programming can be reused to provide a low cost solution for wireless systems.

FIG. 1 is a block diagram of a related art diversity antenna system 10 that includes a related art ATU 12 having a receive only (RX) tuner circuit 14 that is usable to tune an RX antenna 16. The RX antenna 16 can be a diversity/multiple-input-multiple-output (MIMO)/integrated mobile broadcast (IMB) type antenna. The ATU 12 also includes an integrated RX switch 18 that selectively couples the RX tuner circuit 14 to the RX antenna 16 through an electrostatic discharge (ESD) protection circuit 20. An integrated tuner switch 22 selectively couples the RX tuner circuit 14 to a transceiver interface 24 through RX only filters 26.

A power amplifier (PA) circuitry 28 is coupled between the transceiver interface 24 and a single pole multiple throw (SPxT) switch 30 through duplexers 32. The SPxT switch 30 selectively couples a transmit (TX) antenna 34 to the duplexers 32 as well as to LTE-TDD RX band filters 36. An antenna matching and ESD circuit 38 is coupled between the SPxT switch 30 and the antenna 34. The PA circuitry 28 includes PA stages 40 and may include directional couplers 42 and TX switches 44. A switch mode power supply (SMPS) 46 is coupled to a battery 48 that provides power to the PA circuitry 28.

FIG. 2 is a block diagram of a related art TX only/RX only antenna system 50, wherein an RX antenna 52 is only usable for receiving signals and a TX antenna 54 is only usable for transmitting signals. As such, the duplexers 32 (FIG. 1) are replaced by TX only filters 56. A third antenna (not shown) could be added to provide RX diversity.

The related art diversity antenna system 10 (FIG. 1) and the related art TX only/ RX only antenna system 50 both need a broadband receive only tuner that cover bands that range in frequency from 728 MHz up to 2690 MHz in order to cover all of the bands of the third generation partnership project (3GPP). FIG. 3 is a table that provides frequency information for twenty operating bands of 3GPP. A first column of the table provides the number of each 3GPP band. A second column provides uplink (UL) band frequencies for a base station (BS) receive operation and a third column provides UL band frequencies for a user equipment (UE) transmit operation. In particular, the second column lists UL low frequencies (FUL LOW) and the third column lists UL high frequencies (FUL HIGH). A fourth column and a fifth column of the table provide downlink (DL) band frequencies for a base station (BS) transmit operation and a user equipment (UE) receive operation, respectively. In particular, the fourth column lists DL low frequencies (FDL LOW) and the third column lists DL high frequencies (FDL HIGH). A sixth column provides a duplex mode for each 3GPP band. The duplex mode is frequency division duplex (FDD) for all bands listed except for bands 15 and 16, which are reserved.

FIG. 4 is a circuit diagram of a related art broadband tuner circuit 58 that has a possibility of being integrated with an RX RF switch 60. For exemplary purposes, the RX RF switch 60 is a single pole four throw (SP4T) type having two low-band outputs 62 and two high-band outputs 64. A single reactance element 66 is coupled between a switch input 68 and an RF input 70. An antenna 72 is coupled to the RF input 70. The antenna 72 is a diversity MIMO type antenna. A first variable capacitive element 74 is coupled between the switch input 68 and ground GND. A second variable capacitive element 76 is coupled between the RF input 70 and ground GND. The first variable capacitive element 74 and the second variable capacitive element 76 combined with the single reactance element 66 forms a pi-network. However, the related art broadband tuner circuit 58 does not provide enough broadband tuning to cover the 3GPP bands because the single reactance element 66 presents a relatively large reactance at the highest frequencies of the 3GPP bands.

FIG. 5 is a circuit diagram of another related art broadband tuner circuit 78 that includes a low band tuner 80 and a high band tuner 82. The low band tuner 80 has a first reactance element 84 coupled between an RF input 86 and an first switch input 88. The low band tuner 80 further includes a first tunable capacitive element 90 that is coupled between the RF input 86 and ground GND, and a second tunable capacitive element 92 that is coupled between the first switch input 88 and ground GND. The high band tuner 82 further includes a second reactance element 94 coupled between the RF input 86 and a second switch input 96. A third tunable capacitive element 98 that is coupled between the RF input 86 and ground GND, and a fourth tunable capacitive element 100 that is coupled between the second switch input 96 and ground GND. However, the broadband tuner circuit 78 is deficient in that the first reactance element 84 requires a relatively large inductance value and the second reactance element 94 is needed to tune high-band frequencies. Another deficiency is that the low band tuner 80 will load the high band tuner 82 during high band operation. A similar deficiency occurs during low band operation. However, during low band operation, it is the high band tuner 82 that loads the low band tuner 80. Both of these loading deficiencies are caused by having the low band tuner 80 and the high band tuner 82 share the RF input 86 as a common node.

In spite of the difficulties mentioned above ATUs are presently being considered for MIDs in order to enhance the TRP/TIS of mobile terminals for the purpose of providing better high speed data operation. However, presently considered ATUs are designed to adjust impedance matching between an antenna and a radio interface to provide tuning for both a transmitter circuit and a receiver circuit. Thus, due to the large transmitter power, a relatively expensive dual purpose ATU solution is most often deemed necessary. However, a user usually operates a mobile terminal in a high speed data downlink mode. Moreover, with the advent of 4G mobile terminals like long term evolution time division duplex (LTE-TDD), which have higher modulation bandwidth and higher downlink data rates, the quality of downlink performance is critical. As a result, improvements in TIS are more critical than improvements in TRP. Therefore, what is needed is an ATU that includes a receive only tuner circuit for a mobile terminal that has increased TIS along with reduced cost of implementation.

SUMMARY

The present disclosure provides an antenna tuner unit (ATU) that has a relatively broad tuning range. The disclosed ATU includes a radio frequency (RF) switch circuit having an N number of switch inputs, wherein N is a natural number equal to 2 or greater. An N number of reactance elements are coupled in series between an RF input and one of the N number of switch inputs. Taps between adjacent pairs of the N number of reactance elements, wherein each of the taps is coupled to a corresponding one of the N number of switch inputs. The ATU further includes a capacitive element for each of the taps, wherein each capacitive element is coupled between a corresponding one of the taps and a voltage node.

In at least one embodiment, each of the capacitive elements is made up of a programmable capacitor array. Moreover, anti-resonant capacitive elements, one for each of the N number of reactance elements except for an Nth reactance element that is nearest to the RF input. Individual ones of the anti-resonant capacitive elements are coupled in parallel with a corresponding one of the N number of reactance elements to eliminate a low impedance path to a voltage node at a corresponding switch input. The low impedance path can be through one of the capacitive elements coupled from the taps to the voltage node. The elimination of the low impedance path prevents a loading of a higher band switch input during a higher band operation. Alternately, a high impedance path may be created by relocating capacitive elements such that they are coupled between switch outputs and the voltage node. In this way, switches between the switch inputs and outputs can be opened to eliminate low impedance paths at the switch inputs. As a result, the anti-resonant reactance elements are not needed to eliminate low impedance paths. However, the anti-resonant reactance elements remain usable for refining band tuning.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 3 is a table listing uplink and downlink operating bands usable with a receive only tuner integrated with an RF switch of FIGS. 1 and 2.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
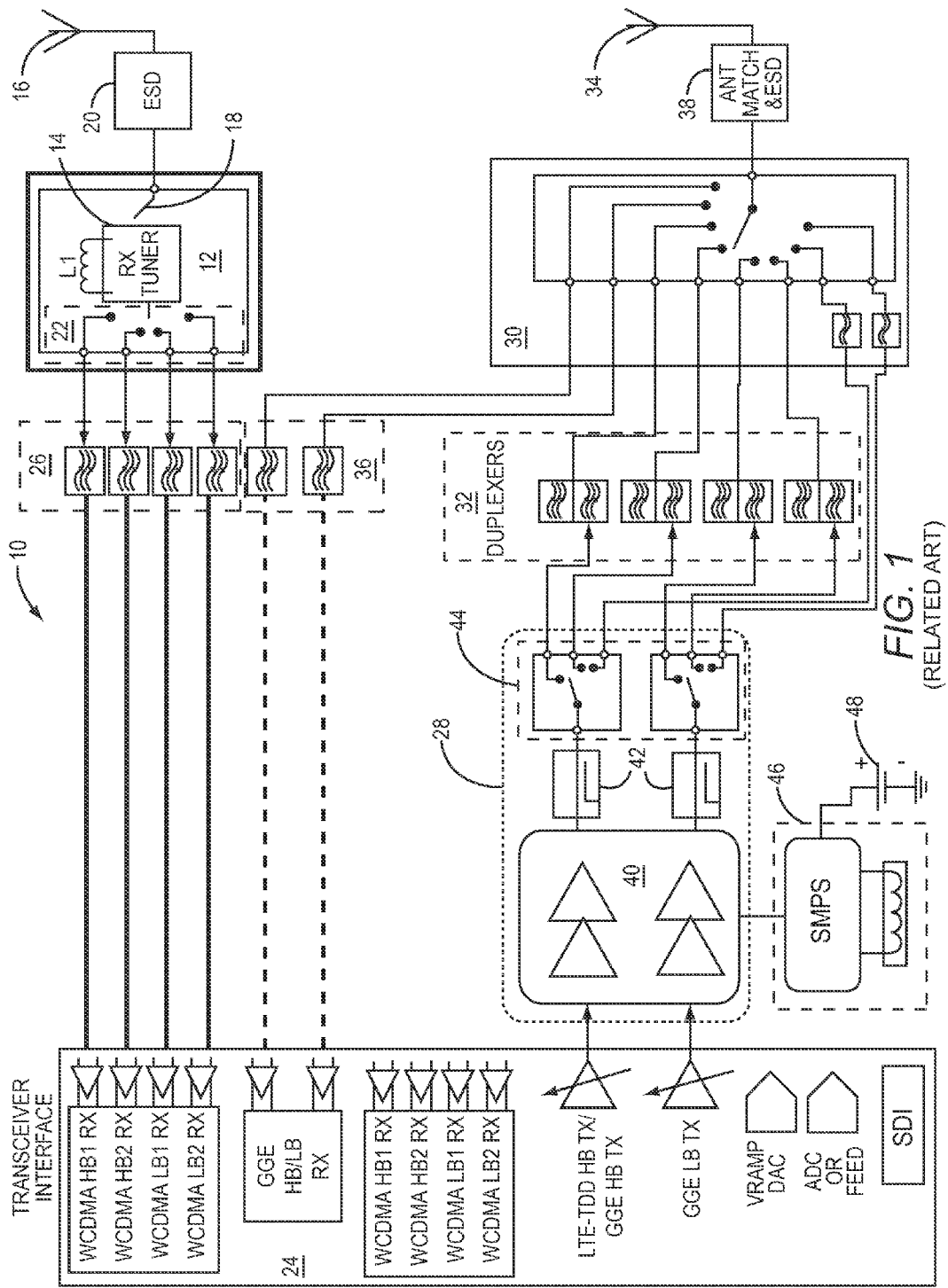
FIG. 1 is a block diagram that depicts a related art receive only tuner integrated with a receive RF switch on a diversity antenna of a cellular system.
Figure 2:
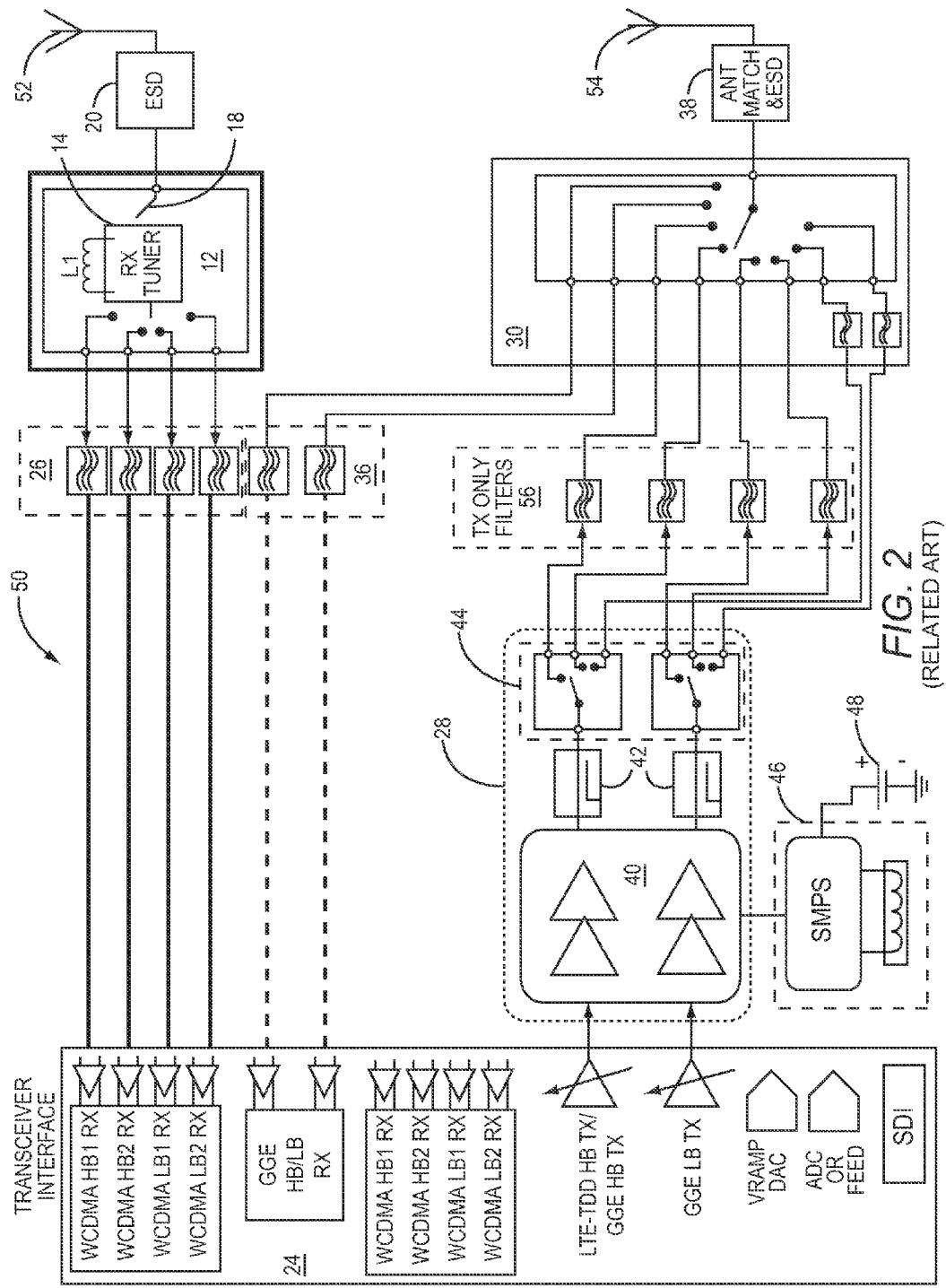
FIG. 2 is a block diagram that depicts a related art receive only tuner integrated with an RF switch on an RX antenna of a cellular system having separate RX and TX antennas.
Figure 4:
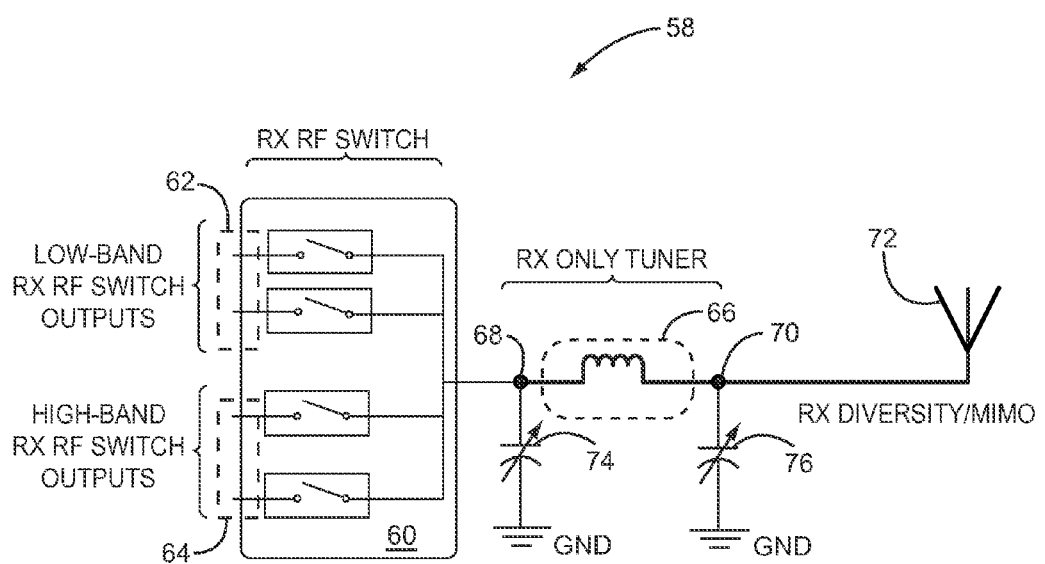
FIG. 4 is a circuit diagram of a related art broadband antenna tuner unit (ATU) having a single reactance that drives a common RF input of a single pole multi-throw (SPxT) switch.
Figure 5:
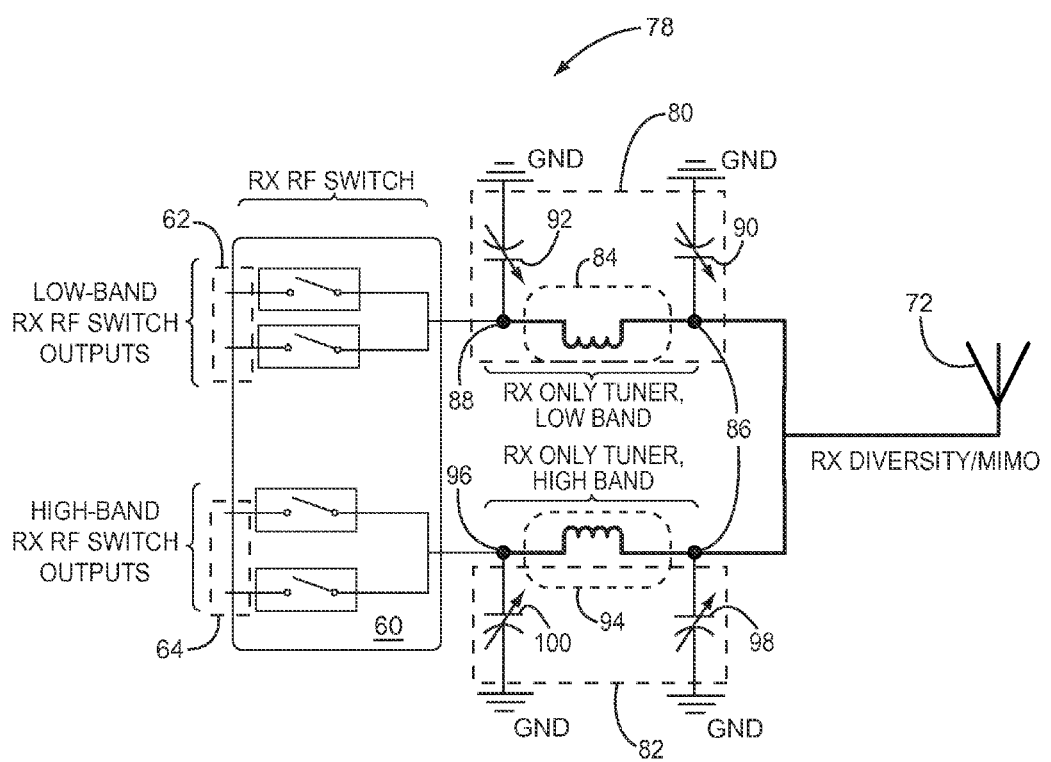
FIG. 5 is a circuit diagram of a related art system having two ATUs that drive a common RF input of a SPxT switch for separate band ranges.
Figure 6:
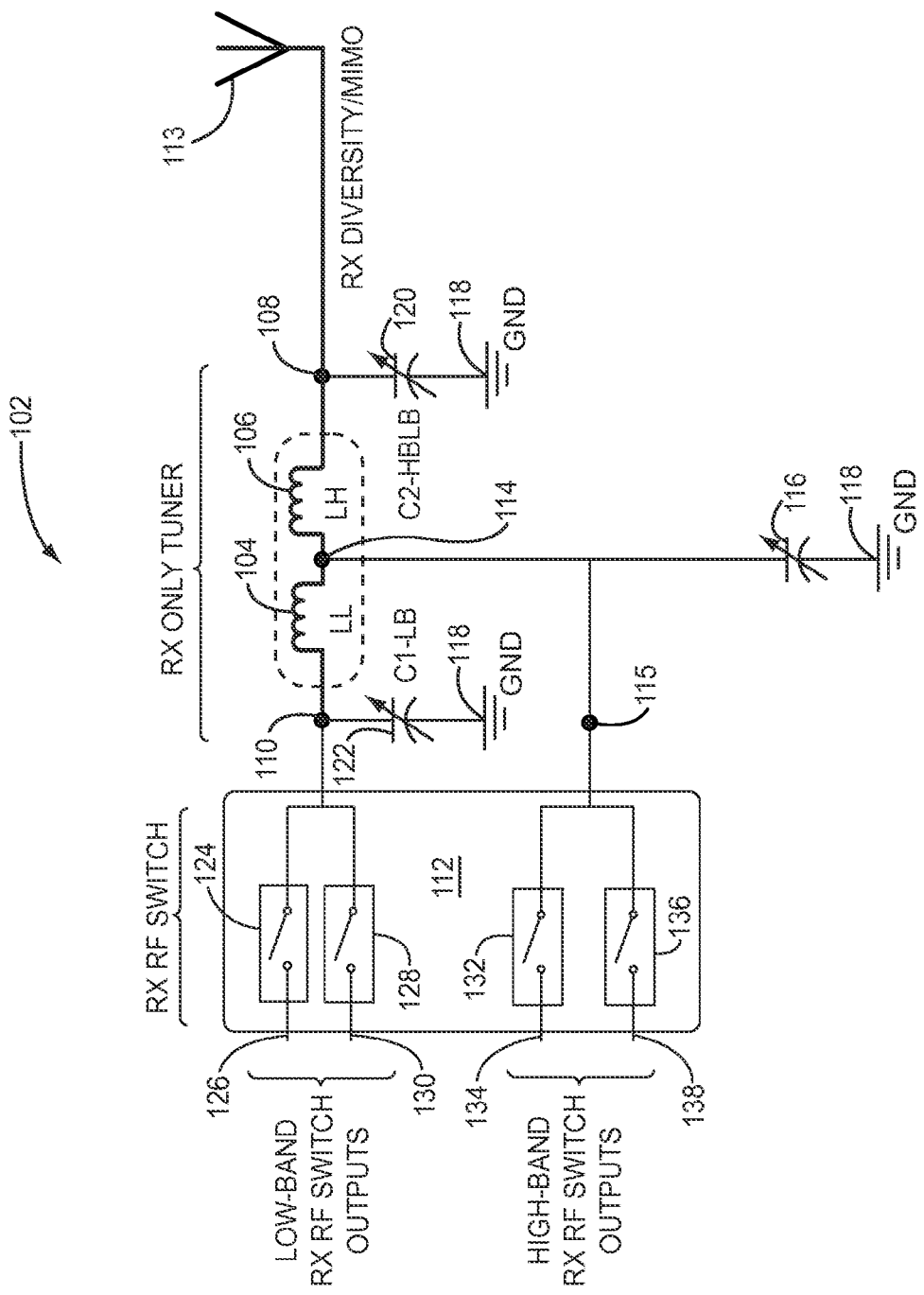
FIG. 6 is a circuit diagram of an ATU embodiment according to the present disclosure having a reactance split into a high-band reactance element for driving a high-band switch and a low-band reactance element for driving a low-band switch.

FIG. 6 is a circuit diagram of an ATU 102 that is in accordance with the present disclosure. The ATU 102 includes a first reactance element 104 and a second reactance element 106 that are coupled in series between an RF input 108 and a first switch input 110 of a receive (RX) RF switch circuit 112. An antenna 113 is coupled to the RF input 108. The antenna is typically an RX diversity/multiple-input-multiple-output (MIMO) type antenna. A tap 114 located between the first reactance element 104 and the second reactance element 106 is coupled to a second switch input 115 of the RX RF switch circuit 112. A tap capacitive element 116 is coupled between the tap 114 and a voltage node 118 such as ground GND. An input capacitive element 120 is coupled between the RF input 108 and the voltage node 118. An output capacitive element 122 is coupled between the first switch input 110 and the voltage node 118.

The RX RF switch circuit 112 includes a first low band switch 124 coupled between the first switch input 110 and a first low band output 126. A second low band switch 128 is coupled between the first switch input 110 and a second low band output 130. The RX RF switch circuit 112 also includes a first high band switch 132 coupled between the second switch input 114 and a first high band output 134. A second high band switch 136 is coupled between the second switch input 114 and a second high band output 138.

The first reactance element 104 and the second reactance element 106 are typically inductors that have a combined inductance that is suitable for tuning low band RF signals. An exemplary combined inductance for the first reactance element 104 and the second reactance element 106 is on the order of 4.8 nH. The second reactance element 106 has an inductance that is suitable for tuning high band signals. An exemplary inductance for the second reactance element 106 is on the order of 2.4 nH. The combined inductance of the first reactance element 104 and the second reactance element 106 for tuning low band RF signals allows a reduction of a number of reactance elements typically required by related art ATUs. Thus, the ATU 102 offers significant reduction in die area needed for reactance elements. For example, an inductance of 2.4 nH requires about 680×680 μm². Therefore, since the ATU 102 eliminates a need for an extra reactance element for tuning the high band, about 680×680 μm² of die space is saved when compared to related art ATUs.

The tap capacitive element 116 has a variable capacitance value that is tunable over a range to further tune both low band and high band reception. The input capacitive element 120 also has a variable capacitance value that is tunable over a range to further tune both high band and low band reception. Further still, the output capacitive element 122 has a variable capacitance value that is tunable over a range for further tuning low band reception.

Figure 7:
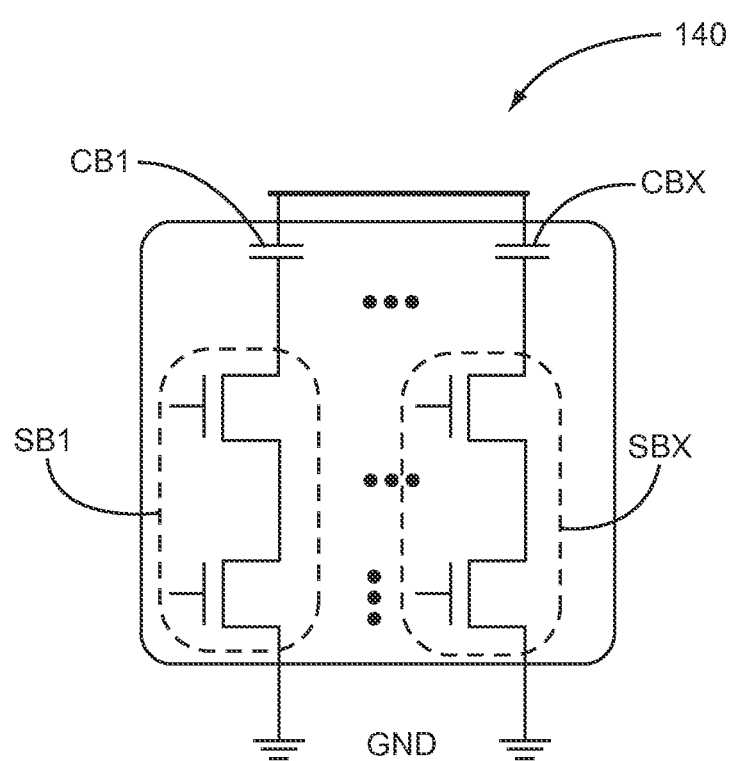
FIG. 7 is a circuit diagram of a programmable capacitor array that is usable for dynamically tuning the ATU.

FIG. 7 depicts a programmable capacitor array 140 that is individually usable for the tap capacitive element 116, the input capacitive element 120, and the output capacitive element 122. The programmable capacitor array 140 includes a plurality of capacitors CB1-CBX. Each of the plurality of capacitor CB1-CBX is switchable via field effect transistor (FET) switch branches SB1-SBX, wherein X is the number of FET switch branches SB1-SBX. Notice that each of the FET switch branches SB1-SBX only includes two series FETs that are controlled by three tuning bits. Tuning of the programmable capacitor array 140 is accomplished by turning on and off selected ones of the FET switch branches SB1-SBX. In one embodiment, the programmable capacitor array 140 is made up of integrated capacitors having binary-weighted capacitance values. Unlike the ATU 102 of the present disclosure, a typical ATU for a mobile terminal transmitter would be at least seven times larger due to higher voltage requirements that call for the use of fourteen FET elements for the same number of tuning bits.

Figure 8:
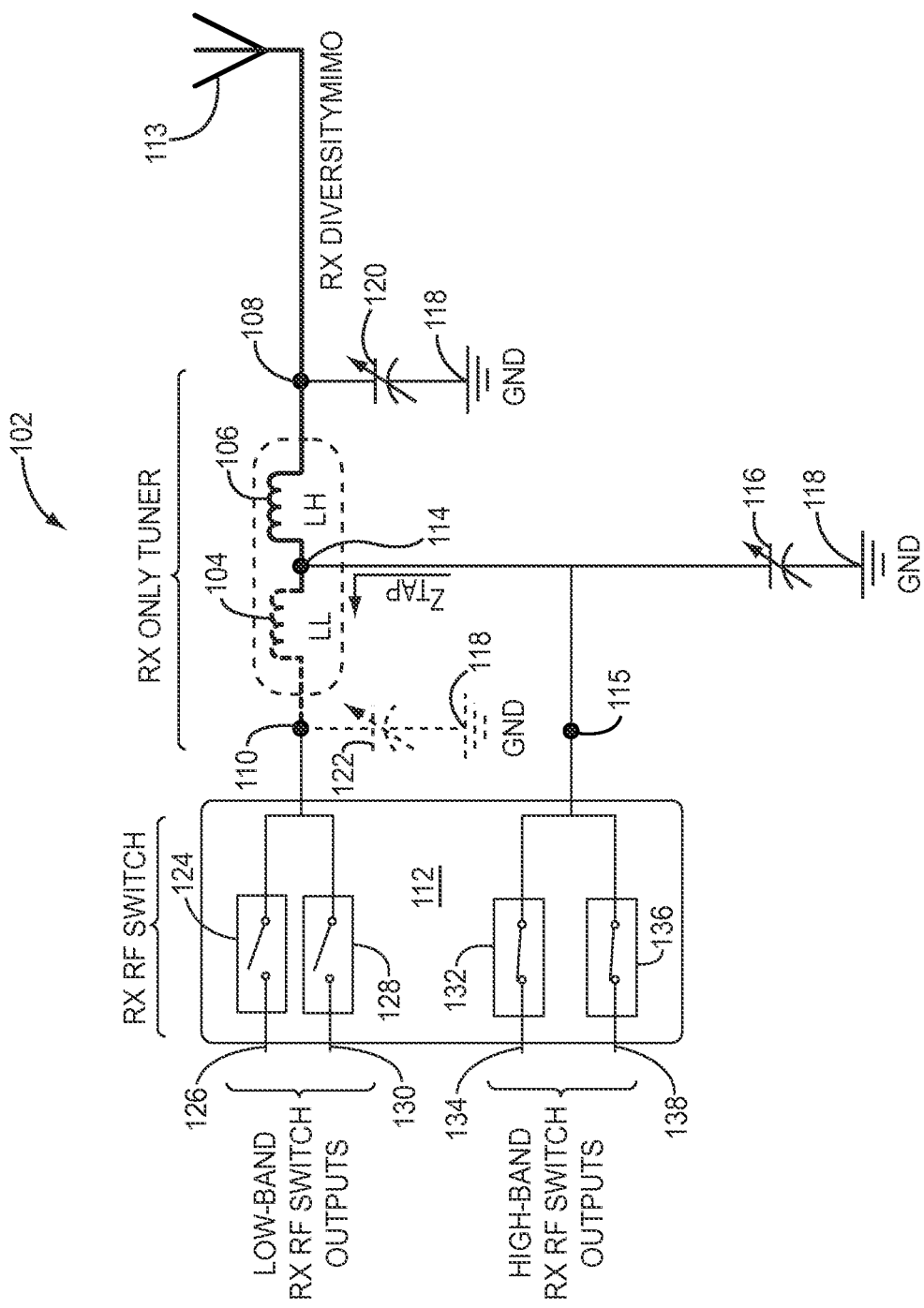
FIG. 8 is the circuit diagram of the ATU embodiment of FIG. 6 during a high-band reception session.

FIG. 8 is a circuit diagram of the ATU 102 that illustrates a loading at the tap 114 during a high band reception operation of the ATU 102. The loading is due to a relatively low impedance path represented by dashed line through the first reactance element 104 and the output capacitive element 122. An impedance $Z_{TAP}$ as seen looking into the first reactance element 104 from the tap 114 is due to an inductive reactance of the first reactance element 104 combined with the capacitive reactance of the output capacitive element 122. At least some frequencies encountered at the tap 114 during high band reception will result in the capacitive reactance of the output capacitive element 122 subtracting from the inductive reactance of the first reactance element 104 such that the impedance $Z_{TAP}$ is low enough to degrade the performance of high band reception.

Figure 9:
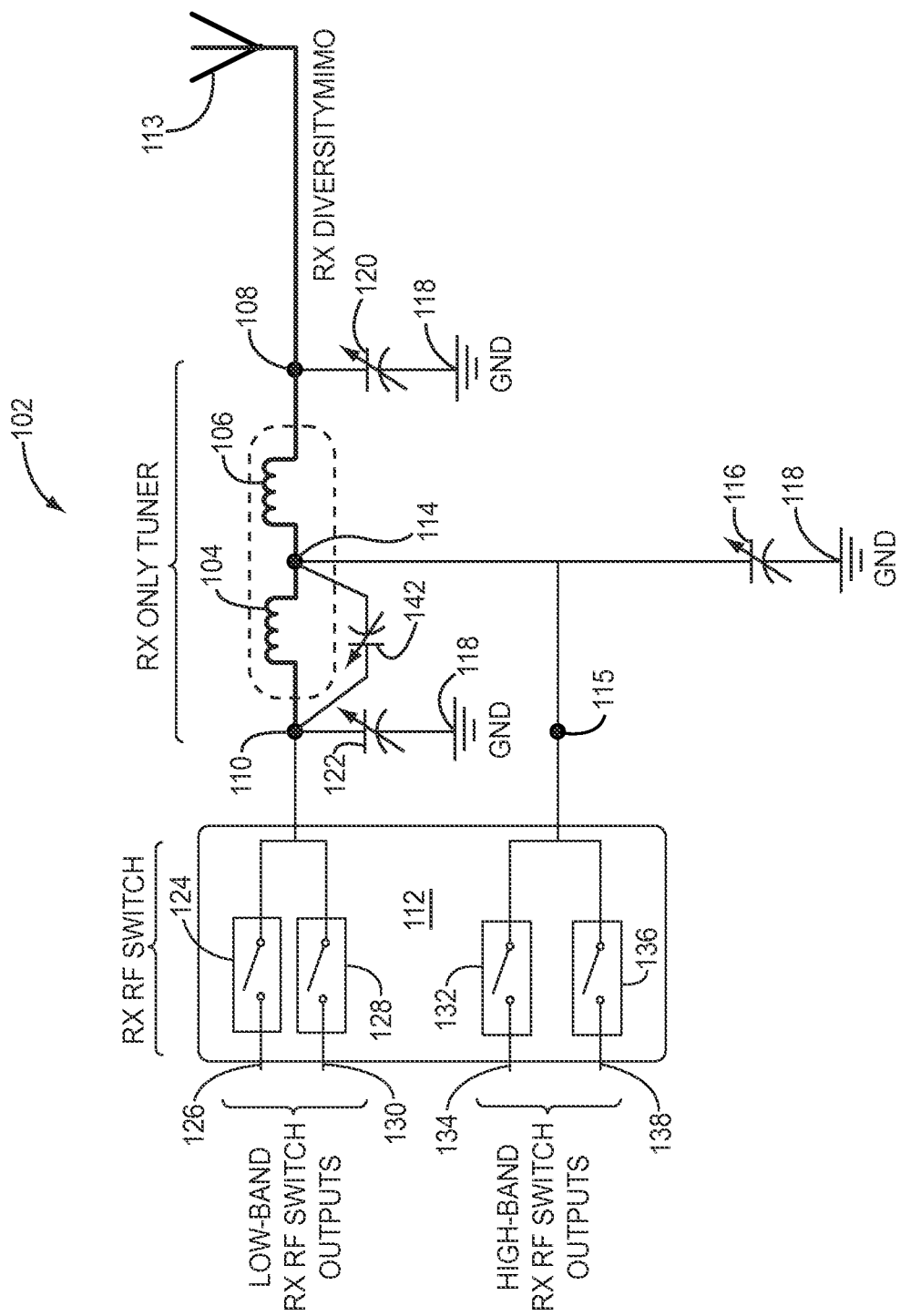
FIG. 9 is a circuit diagram of another ATU embodiment that adds a parallel resonance capacitor to the low-band section for aiding both high-band and low-band operation.

FIG. 9 is a circuit diagram of the ATU 102 that is modified to increase the performance of high band reception by adding a parallel resonance capacitive element 142 across the first reactance element 104. In one embodiment, the parallel resonance capacitive element 142 is a programmable capacitor array such as the programmable capacitor array 140 (FIG. 7).

Figure 10:
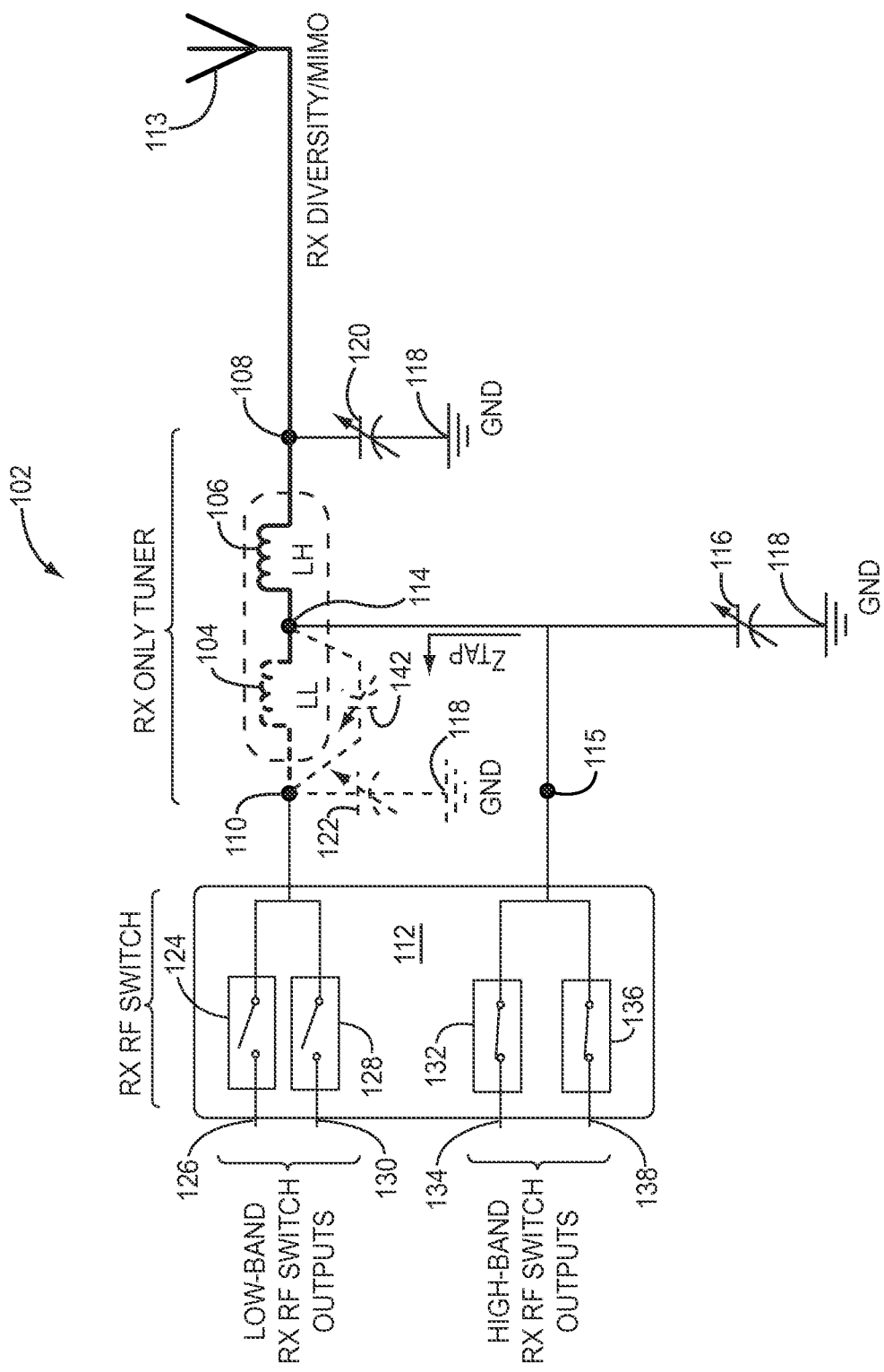
FIG. 10 is a circuit diagram of the ATU embodiment of FIG. 9 illustrating increased impedance at a tap during high-band operation.

FIG. 10 is a circuit diagram of the ATU 102 illustrating an increase in the impedance $Z_{TAP}$ due to the addition of the parallel resonance capacitive element 142 across the first reactance element 104. In particular, the parallel resonance capacitive element 142 is tunable such that anti-resonance between the first reactance element 104 and the parallel resonance capacitive element 142 generates a relatively large value of impedance for the impedance $Z_{TAP}$. The parallel resonance capacitive element 142 is also usable to increase a tuning range for low band reception.

Figure 11:
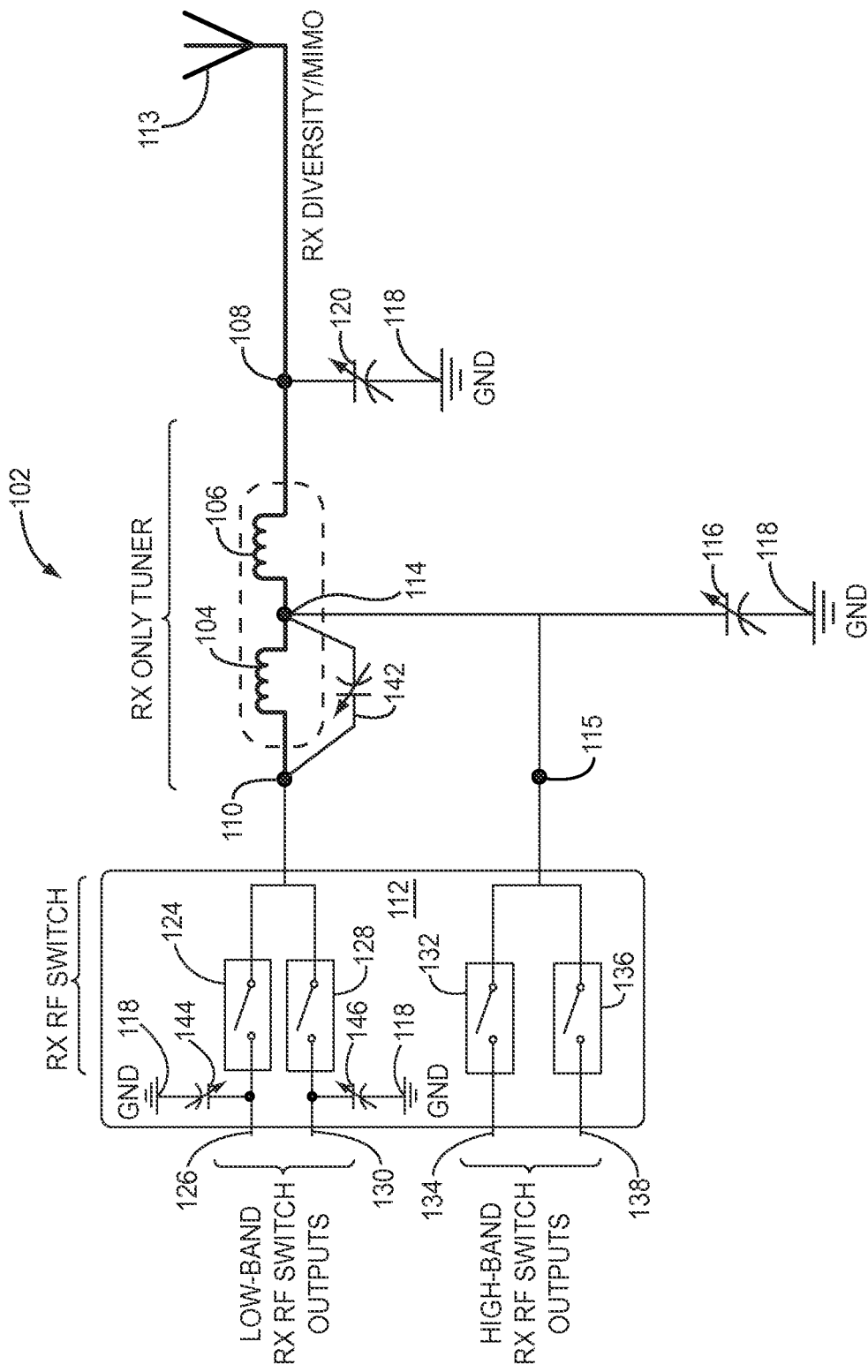
FIG. 11 is a circuit diagram of another ATU embodiment that splits and relocates a tuning capacitor from a switch input side to a switch output side.

FIG. 11 is a circuit diagram of the ATU 102 that is modified to further increase the impedance $Z_{TAP}$. In this case, the output capacitive element 122 (FIG. 10) is eliminated in favor of coupling a first low band capacitive element 144 between the first low band output 126 and ground GND, and coupling a second low band capacitive element 146 between the second low band output 130 and ground GND. Both the first low band capacitive element 144 and the second low band capacitive element 146 are each made up of a programmable capacitor array such as the programmable capacitor array 140 (FIG. 7).

The impedance $Z_{TAP}$ is increased practically to infinity by opening the first low band switch 124 and the second low band switch 128 when the ATU 102 is being operated for high band reception. Advantageously, during operation of the ATU 102 for low band reception, the first low band capacitive element 144 and the second low band capacitive element 146 may be used to increase a tuning range for low band reception. Interestingly, the parallel resonance capacitive element 142 can be eliminated because there is no need for anti-resonance since the output capacitive element 122 is eliminated in this case. Nevertheless, the parallel resonance capacitive element 142 is retained in this embodiment because the parallel resonance capacitive element 142 is still usable to increase the tuning range of the ATU 102 during low band reception.

Figure 12:
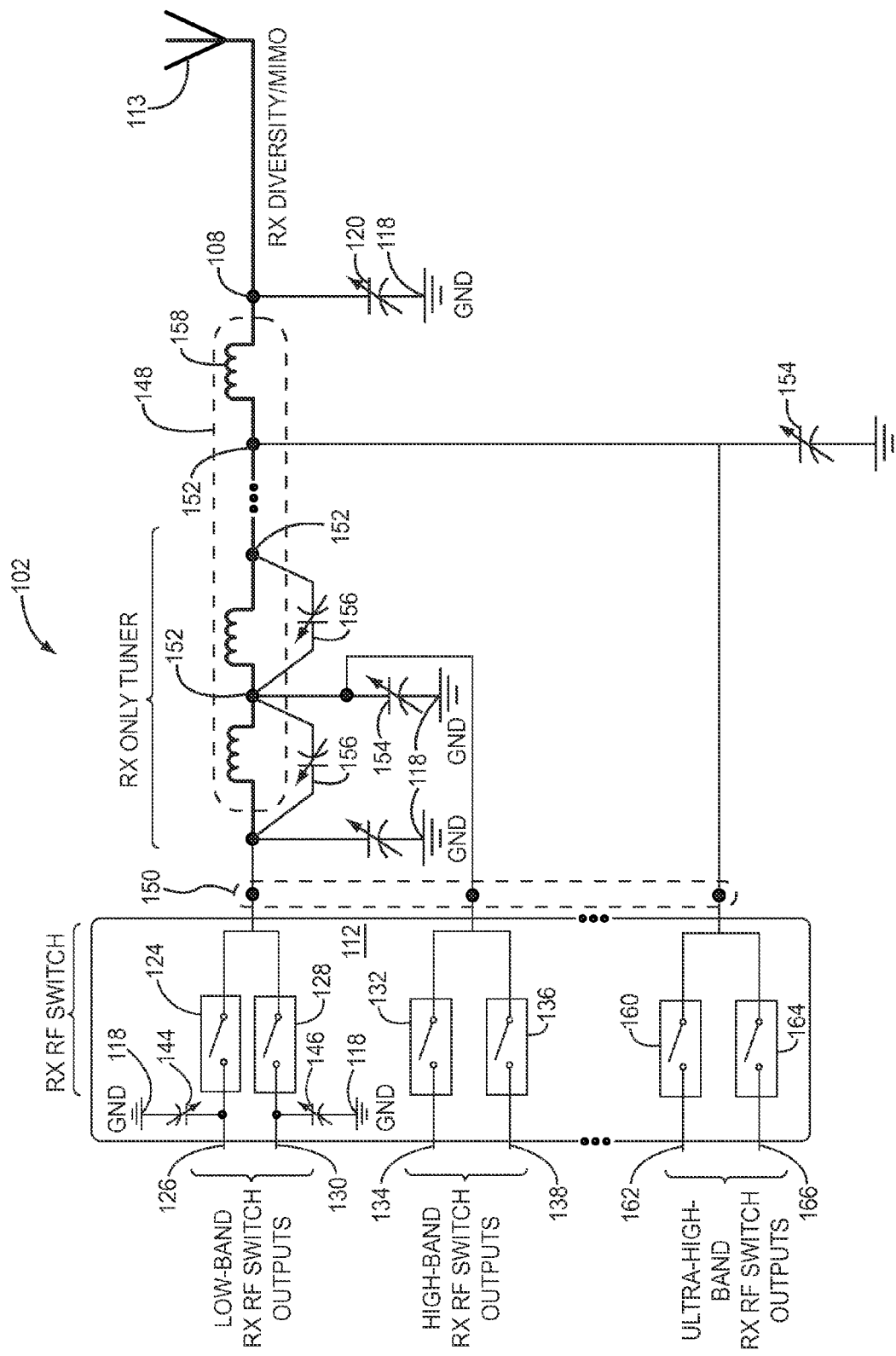
FIG. 12 is a circuit diagram of a generalized embodiment of an ATU having more than two reactance sections for tuning more than two bands.

FIG. 12 is a circuit diagram of a generalized embodiment of the ATU 102 having an N number of reactance elements 148 and an N number of switch inputs 150, wherein N is a natural number equal to two or greater. In this generalized embodiment of ATU 102, an N number of reactance elements 148 are coupled in series between the RF input 108 and a first one of the N number of switch inputs 150. There are also taps 152 between adjacent pairs of the N number of reactance elements 148. Each of the taps 152 is coupled to a corresponding one of the N number of switch inputs 150. Tap capacitive elements 154, one for each of the taps 152 is coupled between a corresponding one of the taps 152 and the voltage node 118. In at least one embodiment, the voltage node 118 is ground GND. Anti-resonance capacitive elements 156, one for each of the N number of reactance elements except for an Nth reactance element 158 are each coupled in parallel with a corresponding one of the N number of reactance elements 148. The RX RF switch circuit 112 further includes a first ultra-high-band switch 160 that is coupled between an Nth one of the switch inputs 150 and a first ultra-high-band output 162. A second ultra-high-band switch 164 that is coupled between the Nth one of the switch inputs 150 and a second ultra-high-band output 166.

Figure 13:
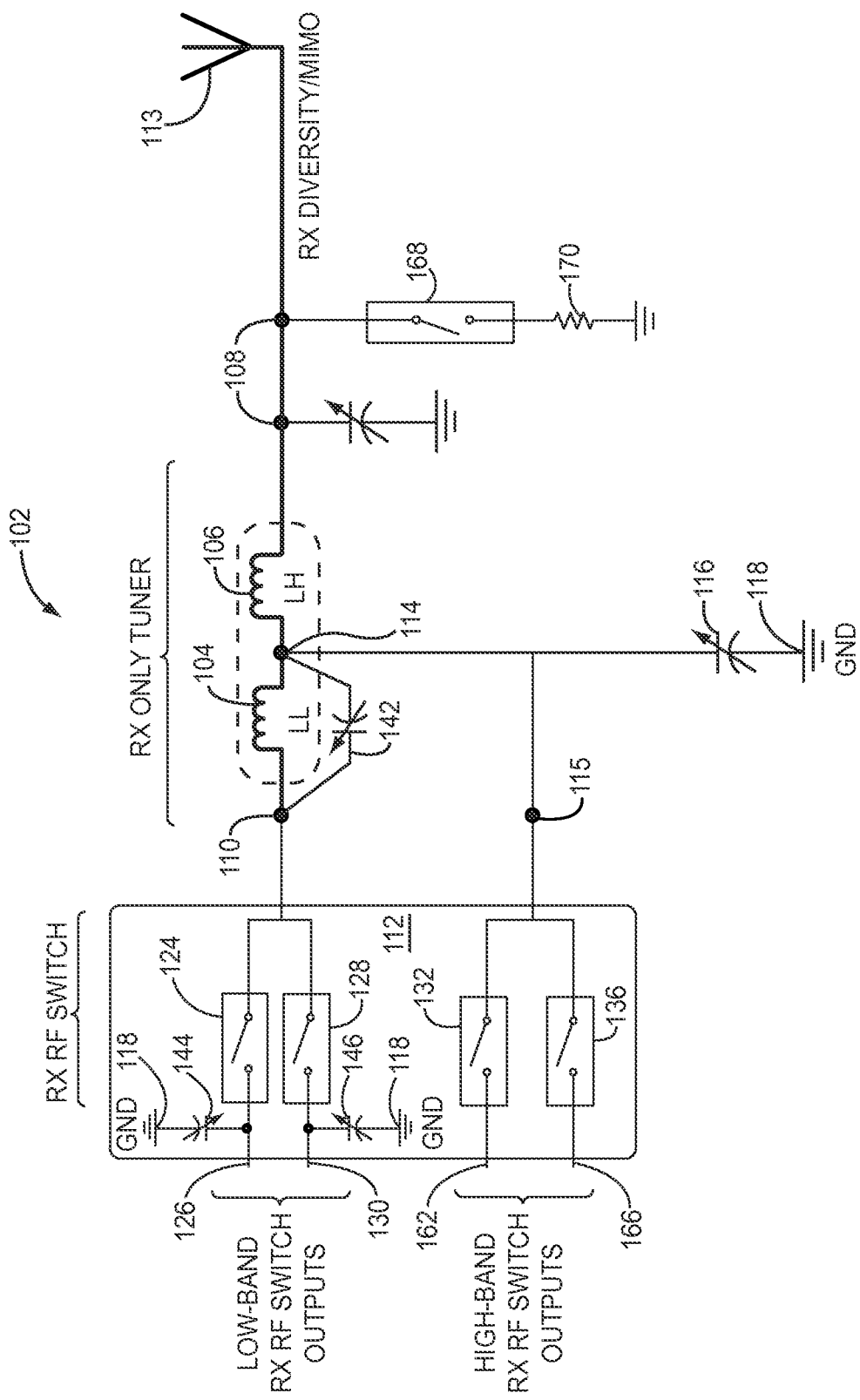
FIG. 13 is a circuit diagram of the ATU embodiment of FIG. 11, wherein an isolation switch is added for protection during high power transmission from an adjacent antenna (not shown).

FIG. 13 is a circuit diagram of the ATU 102 embodiment of FIG. 11 wherein an isolation switch 168 in series with an isolation resistor 170 is added for protection during high power transmission from an adjacent transmit antenna (not shown). Typical RX only tuners are designed to withstand a maximum voltage due to TX leakage from an adjacent TX/RX or TX only antenna (not shown). Long term evolution (LTE) or wideband code division multiple access (WCDMA) have an average TX power at the adjacent TX/RX or TX only antenna of around +24 dBm with a 7 dB peak-to-average ratio due to signal modulation. Therefore, a leakage power at the antenna 113 would be on the order of +24 dBm+7 dB−10 dB, which equals +21 dBm of peak power. Global system for mobile communications (GSM) TX leakage is even a greater concern. While transmitting in the low band, as much as +35 dBm is transmitted from the adjacent TX/RX or TX only antenna. Thus, a 10 dB antenna isolation would still allow for +25 dBm peak power to leak to the antenna 113. Fortunately, during GSM mode operation there is no need for diversity reception or a frequency division duplex mode. As a result, there is no need for the ATU 102 to be in operation during GSM mode operation. Therefore, an isolation switch 168 in series with an isolation resistor 170 is coupled from the RF input 108 to ground GND. During GSM mode operation, the isolation switch 168 is closed so that any leakage power captured by the antenna 113 is routed away from the ATU 102 and dissipated by the isolation resistor 170. Typically, the resistance of the isolation resistor 170 is around 50Ω. The addition of the isolation switch 168 and the isolation resistor 170 eliminates a need to over design the ATU 102 for protection from TX leakage power.

Figure 14:
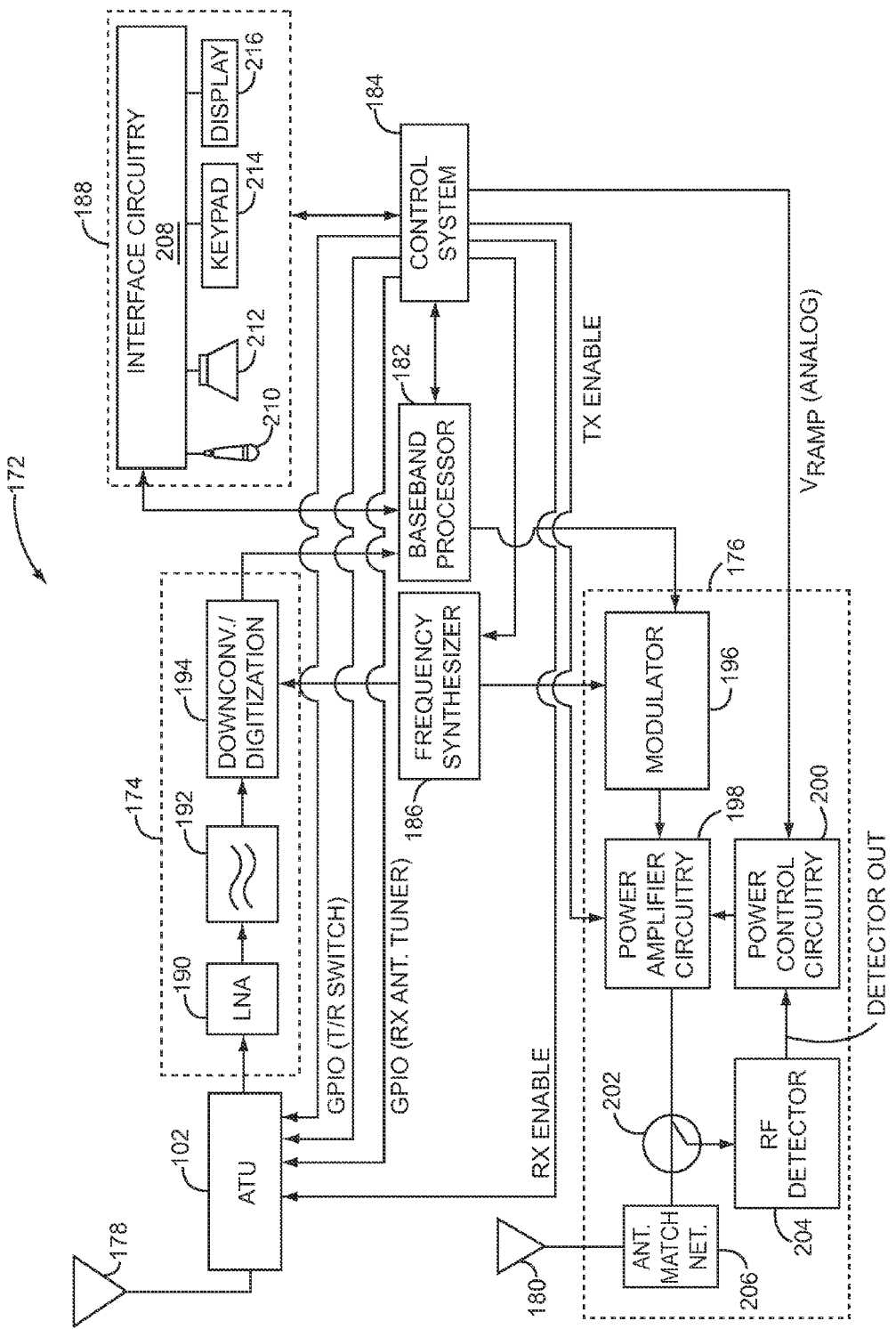
FIG. 14 is a block diagram depicting user equipment (UE) in the form of a mobile terminal that incorporates an embodiment of an ATU of the present disclosure.

The ATU 102 of the present disclosure is preferably incorporated in a mobile terminal 172, such as a mobile telephone, personal digital assistant (PDA), personal computer, or the like. The basic architecture of the mobile terminal 172 is represented in FIG. 14, and may include a receiver front end 174, an RF transmitter section 176, an RX antenna 178, a TX antenna 180, the ATU 102, a baseband processor 182, a control system 184, a frequency synthesizer 186, and an interface 188.

The receiver front end 174 receives information bearing RF signals from one or more remote transmitters provided by a base station (not shown). The ATU 102 tunes the antenna 178 to enhance the reception of an RF signal captured by the antenna 178. A low noise amplifier 190 amplifies the RF signal. A filter circuit 192 minimizes broadband interference in the RF signal, while a downconverter 194 downconverts the filtered received RF signal to an intermediate or baseband frequency signal, which is then digitized into one or more digital streams. The receiver front end 174 typically uses one or more mixing frequencies generated by the frequency synthesizer 186.

The baseband processor 182 processes the digitized received signal to extract the information or data bits conveyed in the received signal. This processing typically comprises demodulation, decoding, and error correction operations. As such, the baseband processor 182 is generally implemented in one or more digital signal processors (DSPs).

On the transmit side, the baseband processor 182 receives digitized data from the control system 184, which it encodes for transmission. The encoded data is output to the radio frequency transmitter section 176, where it is used by a modulator 196 to modulate a carrier signal that is at a desired transmit frequency. PA circuitry 198 amplifies the modulated carrier signal to a level appropriate for transmission from the TX antenna 180. The PA circuitry 198 provides gain for the signal to be transmitted under control of power control circuitry 200, which is preferably controlled by the control system 184 using an adjustable power control signal ($V_{RAMP}$). Further still, a directional coupler 202 samples output power from the PA circuitry 198 and provides a small sample of the output power to the RF detector 204, which in turn provides the DETECTOR OUT signal to the power control circuitry 200.

As a result of providing the DETECTOR OUT signal from the RF detector 204 to the power control circuitry 200, the bias for the PA circuitry 198 is adjusted to maintain a desired output power under varying conditions, such as decreasing battery voltage and/or fluctuating voltage standing wave ratio (VSWR), etc. An antenna matching network 206 is provided to maximize an impedance match between the TX antenna 180 and the directional coupler 202 and the power amplifier circuitry 198. The control system 184 may also provide a transmit enable signal (TX ENABLE) to effectively enable the PA circuitry 198 during periods of transmission.

A user may interact with the mobile terminal 172 via the interface 188, which may include interface circuitry 208 associated with a microphone 210, a speaker 212, a keypad 214, and a display 216. The interface circuitry 208 typically includes analog-to-digital converters, digital-to-analog converters, amplifiers, and the like. Additionally, the interface circuitry 208 may include a voice encoder/decoder, in which case it may communicate directly with the baseband processor 182.

The microphone 210 will typically convert audio input, such as the user's voice, into an electrical signal, which is then digitized and passed directly or indirectly to the baseband processor 182. Audio information encoded in the received signal is recovered by the baseband processor 182 and converted into an analog signal suitable for driving the speaker 212 and the interface circuitry 96. The keypad 214 and the display 216 enable the user to interact with the mobile terminal 172, inputting numbers to be dialed, address book information, or the like, as well as monitoring call progress information.

Those skilled in the art will recognize improvements and modifications to the preferred embodiments of the present disclosure. All such improvements and modifications are considered within the scope of the concepts disclosed herein and the claims that follow.

What is claimed is:

1. An antenna tuner unit (ATU) comprising:
a radio frequency (RF) switch circuit having an N number of switch inputs, wherein N is a natural number equal to 2 or greater;
an N number of reactance elements coupled in series between an RF input and one of the N number of switch inputs;
taps between adjacent pairs of the N number of reactance elements, wherein each of the taps are coupled to a corresponding one of the N number of switch inputs, and
a capacitive element for each of the taps, wherein each capacitive element is coupled between a corresponding one of the taps and a voltage node, and the capacitive element comprises a programmable capacitor array.

2. The ATU of claim 1 wherein the voltage node is ground.

3. The ATU of claim 1 wherein the programmable capacitor array comprises integrated capacitors having binary-weighted capacitance values.

4. The ATU of claim 1 wherein anti-resonant capacitive elements, one for each of the N number of reactance elements except for an Nth reactance element are each coupled in parallel with a corresponding one of the N number of reactance elements.

5. The ATU of claim 1 wherein the radio switch circuit includes RF switches with switch outputs for selectively outputting tuned signals of individual RF bands.

6. The ATU of claim 5 further including capacitive elements coupled between corresponding ones of the switch outputs and a voltage node.

7. The ATU of claim 1 wherein the ATU is adapted to couple to a diversity/multiple-input-multiple-output (MIMO) antenna.

8. The ATU of claim 1 wherein the ATU is protected from relatively high voltage leaks from an adjacent transmit (TX) antenna by an isolation switch in series with an isolation resistor that is communicatively coupled between the RF input and the voltage node.

9. A mobile terminal comprising:
a receive (RX) antenna;
an ATU comprising:
a radio frequency (RF) switch circuit having an N number of switch inputs, wherein N is a natural number equal to 2 or greater;
an N number of reactance elements coupled in series between an RF input and one of the N number of switch inputs; and
taps between adjacent pairs of the N number of reactance elements, wherein each of the taps are coupled to a corresponding one of the N number of switch inputs;
a capacitive element for each of the taps, wherein each capacitive element is coupled between a corresponding one of the taps and a voltage node, wherein the capacitive element comprises a programmable capacitor array; and
a controller adapted to program the programmable capacitor array.

10. The ATU of claim 9 wherein the programmable capacitor array comprises integrated capacitors having binary-weighted capacitance values.

11. The ATU of claim 9 wherein anti-resonant capacitive elements, one for each of the N number of reactance elements except for an Nth reactance element are each coupled in parallel with a corresponding one of the N number of reactance elements.

12. The ATU of claim 9 wherein the radio switch circuit includes RF switches with switch outputs for selectively outputting tuned signals of individual RF bands.

13. The ATU of claim 12 further including capacitive elements coupled between corresponding ones of the switch outputs and the voltage node.

14. The ATU of claim 9 wherein the ATU is adapted to couple to a diversity/multiple-input-multiple-output (MIMO) antenna.

15. The ATU of claim 9 wherein the ATU is protected from relatively high voltage leaks from an adjacent transmit (TX) antenna by an isolation switch in series with an isolation resistor that is communicatively coupled between the RF input and the voltage node.

16. A diversity antenna system comprising:
a diversity receive antenna; and
a radio frequency (RF) switch circuit having an N number of switch inputs, wherein N is a natural number equal to 2 or greater;
an N number of reactance elements coupled in series between an RF input and one of the N number of switch inputs;
taps between adjacent pairs of the N number of reactance elements, wherein each of the taps are coupled to a corresponding one of the N number of switch inputs; and
a capacitive element for each of the taps, wherein each capacitive element is coupled between a corresponding one of the taps and a voltage node, and the capacitive element comprises a programmable capacitor array.

17. The diversity antenna system of claim 16 wherein the voltage node is ground.

18. The diversity antenna system of claim 16 wherein the programmable capacitor array comprises integrated capacitors having binary-weighted capacitance values.

19. The diversity antenna system of claim 16 wherein anti-resonant capacitive elements, one for each of the N number of reactance elements except for an Nth reactance element are each coupled in parallel with a corresponding one of the N number of reactance elements.

20. The diversity antenna system of claim 16 wherein the RF switch circuit includes RF switches with switch outputs for selectively outputting tuned signals of individual RF bands.

21. The diversity antenna system of claim 20 further including capacitive elements coupled between corresponding ones of the switch outputs and a voltage node.

22. The diversity antenna system of claim 16 wherein the ATU is protected from relatively high voltage leaks from an adjacent transmit (TX) antenna by an isolation switch in series with an isolation resistor that is communicatively coupled between the RF input and the voltage node.

* * * * *